(No Model.)
J. S. ADAMS.
PIPE COUPLING.
No. 335,101. Patented Feb. 2, 1886.
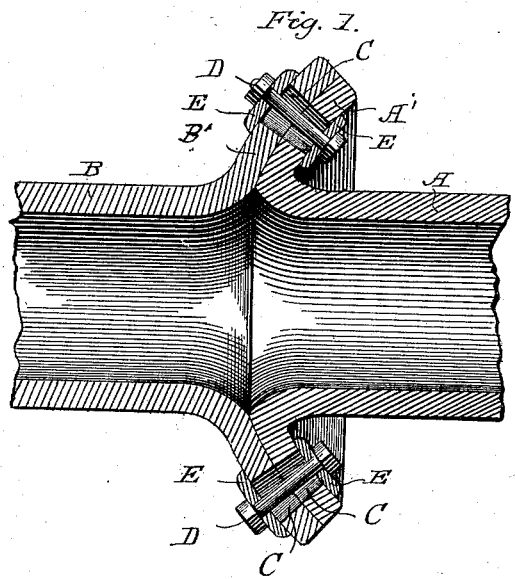
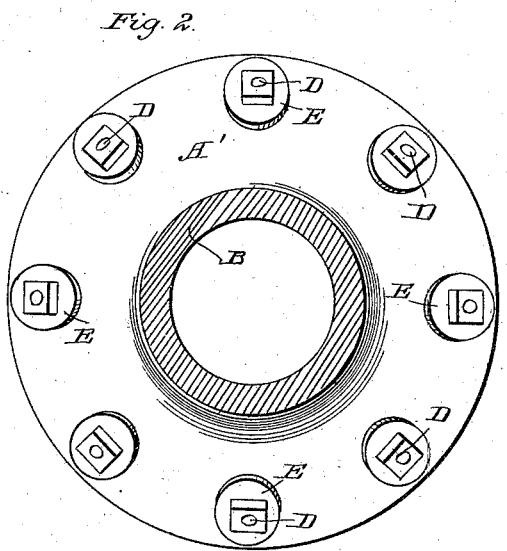
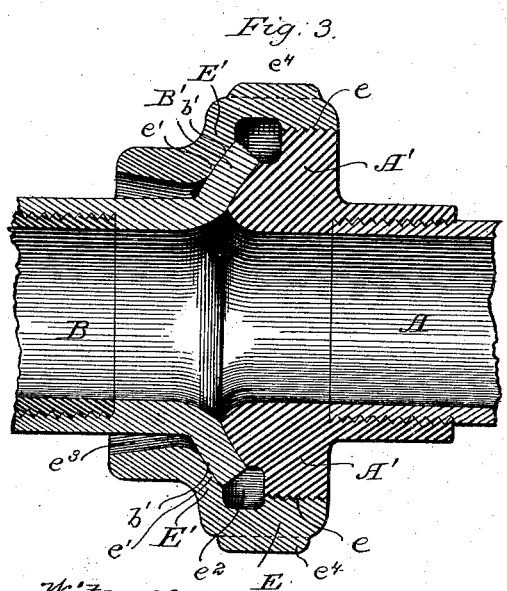
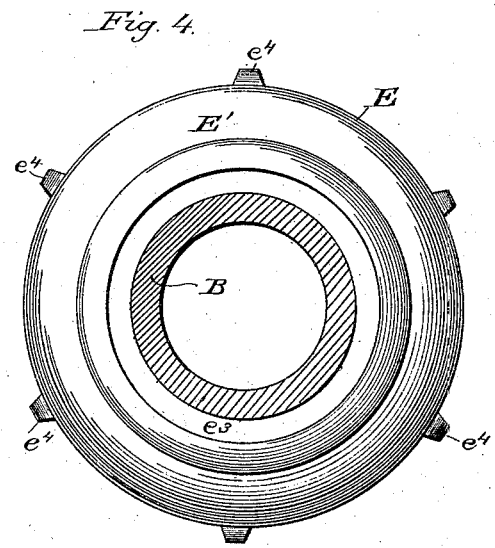
Witnesses:
Jno. W. Stockett
C. C. Poole
Inventor.
John S. Adams
per M. S. Dayton
Attorney
N. PETERS, Photo-Lithographer, Washington, D. C.

UNITED STATES PATENT OFFICE.

JOHN S. ADAMS, OF ELGIN, ILLINOIS, ASSIGNOR TO THE DETROIT IRON TOWER COMPANY, OF DETROIT, MICHIGAN.

PIPE-COUPLING.

SPECIFICATION forming part of Letters Patent No. 335,101, dated February 2, 1886.

Application filed May 31, 1883. Serial No. 96,657. (No model.)

*To all whom it may concern:*

Be it known that I, JOHN S. ADAMS, of Elgin, in the county of Kane and State of Illinois, have invented certain new and useful Improvements in Pipe-Couplings or Union-Joints; and I do hereby declare that the following is a full, clear, and exact description thereof, reference being had to the accompanying drawings, and to the letters of reference marked thereon, which form a part of this specification.

This invention relates to improvements in couplings for pipes, the object being to provide for a limited range of deflective attachment in uniting the pipe-sections, similar to that afforded by a universal joint.

The invention pertakes somewhat of the nature of a ball-and-socket joint; but it differs from this class of couplings as heretofore made, in having the party-spherical faces all on one and the same side of the diameter of a sphere, though not necessarily in the same hemispherical surface. The joint or coupling is herein shown in two forms—one in the nature of a flanged joint, and the other in the nature of a "union-joint."

Figure 1 is an axial section of the coupling in the form of a flanged pipe-joint with fragments of the pipe thereto attached. Fig. 2 is an end view of the matters shown in Fig. 1. Fig. 3 is an axial section of the couplings in the form of a "union-joint," so called; and Fig. 4 is an end view of the matters shown in Fig. 3.

Referring first to Figs. 1 and 2, A and B are the abutting members of the joint, provided, respectively, with the flanges A' and B'. The abutting face of the flange A' is convex, and the opposing face of the flange B' is correspondingly concaved, as distinctly shown in the sectional Fig. 1. Through both these flanges A' and B' are bolt-holes C, larger in diameter than the bolt intended to be used in uniting the flanges. D are the bolts connecting said flanges, and E E are washers inserted beneath the heads and nuts of said bolts, being of sufficient size to cover the enlarged holes C and give suitable support to the heads and nuts of the bolts D. By means of the concavo-convex meeting surfaces of the flanges, and in proportion to the shortness of the radius of such concavity and convexity, the pipes may be united in a deflected position or out of line with each other within moderate limits, the holes C being of such dimensions as to allow passage for the bolts D in such deflected position of the pipes.

Referring next to Figs. 3 and 4, the same letters, A and B, are applied to the abutting parts of the joints; but the flanges A' and B' are somewhat differently constructed. The flange B', which is concave on its abutting face, has its opposite or rear face also curved in a spherical surface parallel with the opposite and concaved face, as plainly shown in Fig. 3. Instead of employing bolts to unite the flanges in this form of the joint, a third member, E, is employed, interiorly threaded to fit the corresponding thread, $e$, on the periphery of the broad flange A', and provided at its opposite ends with the contraction or inwardly-projecting flange E', having its inner face, $e'$, concaved or curved to accurately fit the rear or outer face, $b'$, of the flange B'. The nut E is always in permanent axial relation with the member A; but room is provided at $e^2$ and at $e^3$ for a lateral movement of the member B, whereby the latter may be set in an axial inclination with the member A, and then drawn by the nut E into close union therewith. The convexed and concaved faces of the several members A, B, and E being accurately fitted to each other, the pipes to be joined may obviously be brought together and secured equally closely, whether accurately in line or slightly out of line, as often occurs. The members A and B are of course apertured, as shown, to conform with the caliber of the pipes with which they are connected, and, if desired, they may be rounded off or interiorly enlarged at their meeting faces, as shown in Fig. 3, in order to prevent a contraction of the passage through the joint when the members are axially out of line.

It is obvious that the range of deflection permissible by this construction is limited; but it is sufficient to meet the requirements of all ordinary situations, and to thereby materially facilitate the close connection of pipes by avoiding the care and labor often necessary to bring them accurately in line with each other, while at the same time the joint is equally with the ordinary form of flanged or union joint suited to connect pipes that are axially in line. If desired, any suitable form of packing may be inserted between the meeting faces of the members A and B; or, in the case of the construction shown in Figs. 3 and 4, such packing may, if preferred, be inserted between the flange E' of the nut E and the outer or convex surface of the flange B'. The nut E is preferably provided with the ribs $e^4$, to afford suitable hold for the pipe-wrench.

I claim as my invention—

The pipe-coupling described, composed of the axially-apertured members A and B, the member A having the convexed flange A', provided with an exterior screw-thread, and the member B having the flange B', concaved on its abutting face, and having its rear face convexed in a surface parallel with the opposite concaved surface, in combination with the nut E, interiorly threaded to fit the member A, and provided with the inwardly-projecting flange E', fitted to the convex face of the flange B', and constructed to afford room at $e^2$ and $e^3$ for the lateral movement of the member B, substantially as and for the purpose set forth.

In testimony that I claim the foregoing as my invention I affix my signature in presence of two witnesses.

JOHN S. ADAMS.

Witnesses:
GEO. R. DUNHAM,
JAMES TODD.